United States Patent [19]

Fujimaki et al.

[11] Patent Number: 5,658,627
[45] Date of Patent: Aug. 19, 1997

[54] STRETCHED BLOW MOLDING ARTICLES

[75] Inventors: Takashi Fujimaki; Hiroshi Umeyama, both of Tokyo; Yoshihiro Moteki, Kawasaki; Noriaki Harigai; Masayuki Taniguchi, both of Tokyo; Mitsuhiro Imaizumi, Kawasaki; Thoru Watanabe, Tokyo; Toshiaki Hino, Kawasaki, all of Japan

[73] Assignees: Showa Highpower Co., Ltd.; Toppan Printing Co., Ltd.; Showa Denko K.K., all of Tokyo, Japan

[21] Appl. No.: 533,935

[22] Filed: Sep. 26, 1995

[30] Foreign Application Priority Data

Oct. 12, 1994 [JP] Japan ................ 6-246445

[51] Int. Cl.$^6$ ................ B32B 27/36
[52] U.S. Cl. ................ 428/36.92; 525/540; 264/532; 528/80; 528/272; 428/480; 428/35.7
[58] Field of Search ................ 525/440; 428/35.7, 428/36.92, 480, 482; 528/272, 80, 81, 83, 84, 85; 264/523, 532, 537, 540

[56] References Cited

U.S. PATENT DOCUMENTS

| | | | |
|---|---|---|---|
| 5,314,969 | 5/1994 | Imaizzumi et al. | 528/272 |
| 5,324,556 | 6/1994 | Hino et al. | 428/35.7 |
| 5,436,056 | 7/1995 | Takiyama et al. | 528/272 |

FOREIGN PATENT DOCUMENTS

| | | |
|---|---|---|
| 0488617 | 6/1992 | European Pat. Off. . |
| A-0572256 | 12/1993 | European Pat. Off. . |
| A-0572682 | 12/1993 | European Pat. Off. . |
| 1102420 | 10/1955 | France . |

OTHER PUBLICATIONS

Database WPI, Week 9440, Derwent Publications Ltd., "Injection Blow Mould Product", AN 321756, for JP-A-6-246820, Sep. 6, 1994.

*Primary Examiner*—Ellis Robinson
*Assistant Examiner*—Christos Kyriakov
*Attorney, Agent, or Firm*—Sughrue, Mion, Zinn, Macpeak & Seas

[57] ABSTRACT

Stretched blow molding articles are prepared by using an aliphatic polyester composition having a melting point of at least 70° C. including: 97.5 to 75 parts by weight of an aliphatic polyester copolymer (A) having a Mn of at least 50,000 which is obtained by reacting 100 parts by weight of a polyester diol (a) with 0.1 to 5 parts by weight of diisocyanate, wherein the polyester diol (a) is obtained by conducting a polycondensation of 1 mol of an acid component consisting of 70 to 90 mol % of succinic acid and 10 to 30 mol % of adipic acid, with 1 to 1.1 mol of glycol; and 2.5 to 25 parts by weight of potybutylene succinate (B) with a linear structure, (C) with a branched long chain structure, or (D) with a branched longer chain structure, which have an Mn of at least 50,000 and are composed from some of succinic acid, 1,4-butanediol, polyfunctional comonomer and di- or poly-functional coupling agents.

9 Claims, 3 Drawing Sheets

STRETCHED BLOW MOLDING ARTICLES

BACKGROUND OF THE INVENTION

1. Field of the Invention

The present invention relates to stretched blow molding articles having excellent heat stability and mechanical strength which are prepared by using a special aliphatic polyester composition with rapid biodegradability and sufficiently high molecular weight and specific melt properties for practical use.

2. Discussion of the Background

Recently, with the advancement of the packaging industry, plastic package materials have been developed, and the resulting waste of a large amount of plastics used can pollute rivers, oceans, soil and the like, and has become a serious community problem. To prevent such pollution the development of biodegradable plastics has been desired earnestly; for example, poly(3-hydroxybutylate) produced by fermentation methods using microorganisms, blends of modified ethylene-vinyl acetate copolymer and starch of a naturally occurring polymer, and the like are already known. The former polymer has a drawback in that it is poor in molding properties because the polymer has a thermal decomposition temperature close to its melting point and raw material efficiency is very bad because it is produced by microorganisms. On the other hand, since the naturally occurring polymer of the latter does not by itself have thermoplasticity, the polymer blends have defects in molding properties and poor water resistance, and is greatly limited in its range of applications.

On the other hand, although it is known that aliphatic polyesters are biodegradable, they have hardly been used because enough high molecular weight material to obtain a practical molded product cannot be obtained. Recently, it has been found that a ring-opening polymerization of ε-caprolactone produces a higher molecular weight polymer, and proposals have been made to use the polymer as a biodegradable resin. However, the resulting polymer is limited to only special applications because of a low melting point under 62° C. and a high cost thereof. Further, although glycolic acid, lactic acid and the like are polymerized by a ring-opening polymerization of cyclic dimers of glycolida and lactide thereof to obtain polymers with higher molecular weights so as to be sometimes used as medical fibers and the like, the polymers are not used in great amounts as packaging materials because their decomposition temperatures are close to their melting point and they have defects in their molding properties.

It is no exaggeration to say that high molecular weight polyesters (referring to polyesters having number-average molecular weights of at least 10,000) generally used for packaging materials, in particular, stretched blow molding articles (bottles) having a water proofness and high strength, are limited to a PET-Bottle which is obtained from polyethylene terephthalate, a polycondensate of terephthalic acid (including dimethyl terephthalate) and ethylene glycol. Polyethylene terephthalate is aromatic, and therefore it has no biodegradability.

U.S. Pat. Nos. 5,306,787, 5,310,782 and 5,436,056 disclose a method for producing a biodegradable high molecular weight aliphatic polyester having a melting point of at least 70° C. comprising the step of polycondensation of glycols and aliphatic dicarboxylic acids. Further, U.S. Pat. No. 5,324,556 discloses blow-molded articles consisting of an aliphatic polyester. Furthermore, biaxially stretched blow-molding articles consisting of an aliphatic polyester are disclosed by some of the present inventors (Japanese Patent Laid-Open No. 5-16913 corresponding to Application No. 5-117408).

However, nothing in the prior art discloses or suggests a special aliphatic polyester composition of the present invention.

An object of the present invention is to provide stretched blow molding articles prepared by using a special aliphatic polyester composition which has a sufficiently high molecular weight for practical use and excellent mechanical properties represented by heat stability, tensile strength and gas barrier properties, and which can be rapidly decomposed by microorganisms and the like i.e., the articles are biodegradable as one means of waste disposal so that they may be easily disposed in landfill or in compost after the use thereof.

SUMMARY OF THE INVENTION

As a result of various research and development of polyesters for obtaining stretched blow molding articles having a sufficiently high molecular weight for practical use, the present inventors have obtained a specific aliphatic polyester composition that maintain rapid biodegradability while having a sufficiently high molecular weight for practical use, and then have found that stretched blow molding articles prepared from the composition have good heat stability and mechanical strength as well as a gas barrier property to achieve the present invention.

That is, the present invention provides stretched blow molding articles prepared by using an aliphatic polyester composition [1] having a melting point of at least 70° C. comprising:

97.5 to 75 parts by weight of an aliphatic polyester copolymer (A) having a number-average molecular weight of at least 50,000 which is obtained by reacting 100 parts by weight of a polyester diol (a) with 0.1 to 5 parts by weight of diisocyanate, wherein the polyester diol (a) is obtained by conducting a polycondensation of 1 mol of an acid component consisting of 70 to 90 mol % of succinic acid and 10 to 30 mol % of adipic acid, with 1 to 1.1 mols of glycol; and 2.5 to 25 parts by weight of an aliphatic polyester (B) having a number-average molecular weight of at least 50,000 which is obtained by reacting 100 parts by weight of a polyester diol (b) with 0.1 to 5 parts by weight of diisocyanate, wherein the polyester diol (b) is obtained by conducting a polycondensation of 1 mol of succinic acid with 1 to 1.1 mols of 1,4-butanediol.

Further, the present invention provides stretched blow molding articles prepared by using an aliphatic polyester composition [2] having a melting point of at least 70° C. comprising:

97.5 to 75 parts by weight of the above polyester copolymer (A); and 2.5 to 25 parts by weight of an aliphatic polyester (C) provided with branched Long chains and having a number-average molecular weight of at least 50,000 which is obtained by reacting 100 parts by weight of a polyester polyol (c) with 0.1 to 5 parts by weight of diisocyanate, wherein the polyester polyol (c) is obtained by conducting a polycondensation of 1 mol of succinic acid, 1 to 1.1 mols of 1,4-butanediol and 0.25 to 1 mol % of trifunctional polyol relative to 100 mol % of the succinic acid.

Furthermore, the present invention provides stretched blow molding articles prepared by using an aliphatic polyester composition [3] having a melting point of at least 70° C. comprising:

97.5 to 75 parts by weight of the above polyester copolymer (A); and 2.5 to 25 parts by weight of an aliphatic polyester (D) provided with branched longer chains and having a number-average molecular weight of at least 50,000 which is obtained by reacting 100 parts by weight of a polyester diol (d) with 0.1 to 1 part by weight of diisocyanate and then 0.1 to 4 parts by weight of trifunctional isocyanate, wherein the polyester diol (d) is obtained by conducting a polycondensation of 1 mol of succinic acid and 1 to 1.1 mols of 1,4-butanediol.

Still further, the present invention provides an aliphatic polyester composition [1] having a melting point of at least 70° C. comprising:

97.5 to 75 parts by weight of an aliphatic polyester copolymer (A) having a number-average molecular weight of at least 50,000 which is obtained by reacting 100 parts by weight of a polyester diol (a) wit 0.1 to 5 parts by weight of diisocyanate, wherein the polyester diol (a) is obtained by conducting a polycondensation of 1 mol of an acid component consisting of 70 to 90 mol % of succinic acid and 10 to 30 mol % of adipic acid, with 1 to 1.1 mols of glycol; and 2.5 to 25 parts by weight of an aliphatic polyester (B) having a number-average molecular weight of at least 50,000 which is obtained by reacting 100 parts by weight of a polyester diol (b) with 0.1 to 5 parts by weight of diisocyanate, wherein the polyester diol (b) is obtained by conducting a polycondensation of 1 mol of succinic acid with 1 to 1.1 mols of 1,4-butanediol.

Yet further, the present invention provides an aliphatic polyester composition [2] having a melting point of at least 70° C. comprising:

97.5 to 75 parts by weight of the above polyester copolymer (A); and 2.5 to 25 parts by weight of an aliphatic polyester (C) provided with branched long chains and having a number-average molecular weight of at least 50,000 which is obtained by reacting 100 parts by weight of a polyester polyol (c) with 0.1 to 5 parts by weight of diisocyanate, wherein the polyester polyol (c) is obtained by conducting a polycondensation of 1 mol of succinic acid, 1 to 1.1 mols of 1,4-butanediol and 0.25 to 1 mol % of trifunctional polyol relative to 100 mol % of the succinic acid.

Furthermore, the present invention provides an aliphatic polyester [3] composition having a melting point of at least 70° C. comprising:

97.5 to 75 parts by weight of the above polyester copolymer (A); and 2.5 to 25 parts by weight of an aliphatic polyester (D) provided with branched long chains and having a number-average molecular weight of at least 50,000 which is obtained by reacting 100 parts by weight of a polyester diol (d) with 0.1 to 1 part by weight of diisocyanate and then 0.1 to 4 parts by weight of trifunctional isocyanate, wherein the polyester diol (d) is obtained by conducting a polycondensation of 1 mol of succinic acid and 1 to 1.1 mols of 1,4-butanediol.

Furthermore, in the present specification and claims, the terms "adipic acid" and "succinic acid" include anhydrides thereof.

DETAILED DESCRIPTION OF THE INVENTION

Figure 1:
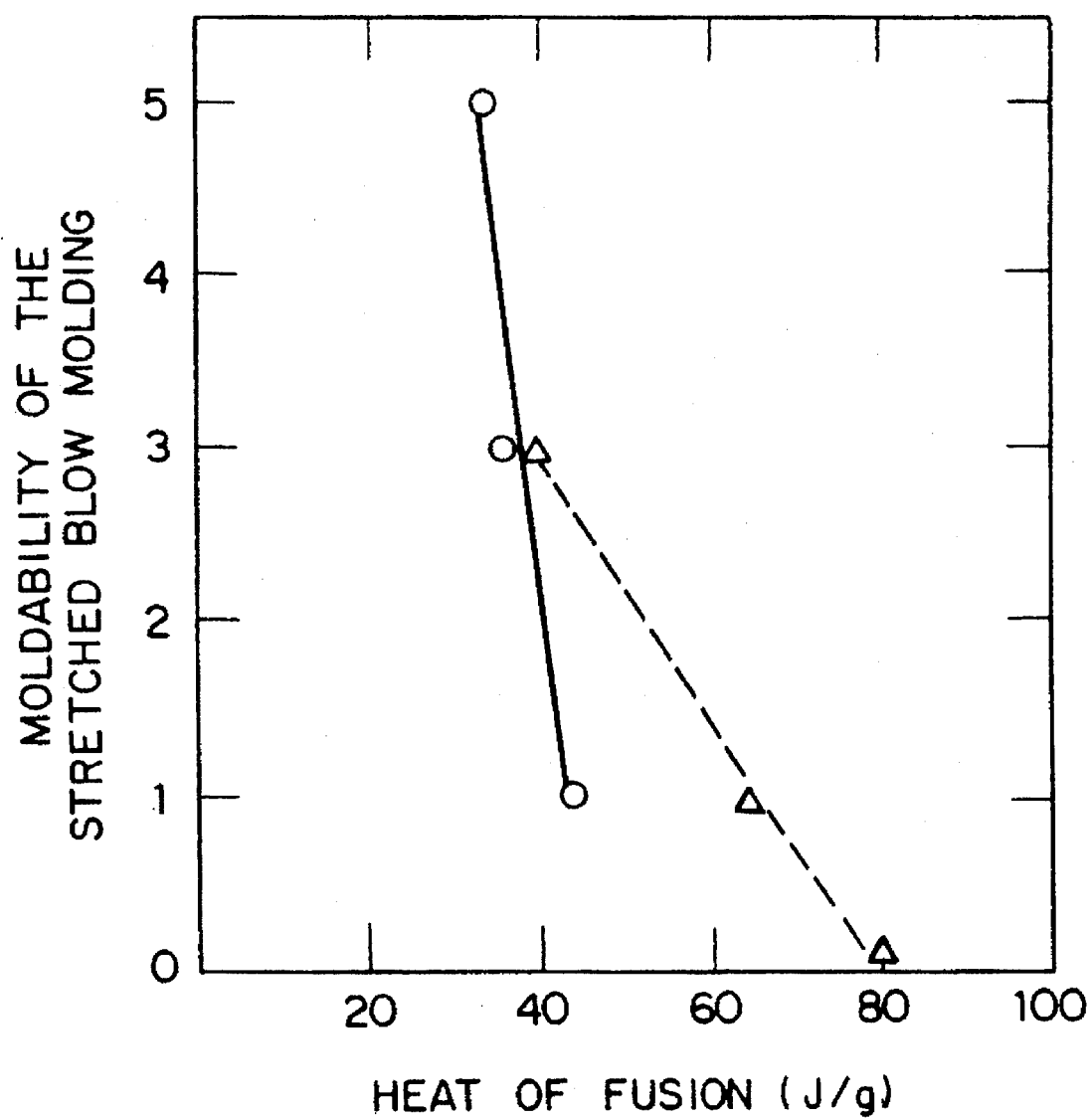
FIG. 1 is a graph representing the relation of the heat of fusion of the composition according to the present invention measured by the DSC method and the stretched blow moldability thereof. ○ denotes the composition of the present invention, and △ denotes the base polymer which is used to obtain the composition.

The present invention will be described below in further detail.

The aliphatic polyester compositions of the present invention include, as an indispensable component, the aliphatic polyester copolymer (A) provided with a linear chain structure, and excellent biodegradability in moist soil, in compost and in the sea.

(Synthesis of the aliphatic polyester copolymer A)

In order to obtain the linear aliphatic polyester copolymer (A), the polyester diol (a) substantially having hydroxyl groups at ends thereof and having a number-average molecular weight of at least 5,000, preferably 10,000, and a melting point of at least 60° C. is firstly prepared. When a polyester diol having a number-average molecular weight of lower than 5,000, for example, 2,500, is used, the small amounts of 0.1–5 parts by weight of coupling agents used in the present invention cannot provide polyester compositions for stretched blow molding having good physical properties. When polyester diol (a) having number-average molecular weights of 5,000 or higher are used, with hydroxyl values of 30 or less, the use of small amounts of coupling agents even under severe conditions such as a molten state and the like can produce high molecular weight polyesters without gelation, as the reaction is not affected by the remaining catalyst.

The polyester diol (a) may be obtained by conducting a polycondensation of 1 mol of an acid component consisting of 70 to 90 mol % of succinic acid and 10 to 30 mol % of adipic acid, with 1 to 1.1 mols of glycol.

The use of scccinic acid in an amount less than 70 mol % will give compositions which have a poor melting point under 90° C. and heat resistance, whereas with greater than 90 mol %, it is difficult to obtain excellent stretched blow molding articles and good biodegradability.

1 to 1.1 mols of glycols relative to 1 mol of the acid component should be used considering that the polyester diol (a) substantially has hydroxyl groups at ends thereof. More than 1.1 mols of glycols leads to a reduction of reaction rate, whereas with less than 1 mol of glycols, it is difficult to increase the molecular weight because of instability of polymer.

Examples of glycols which can be used as the ingredient of polyester diol (a) include ethylene glycol, and 1,4-butanediol, 1,6-hexanediol, decamethylene glycol, neopentyl glycol, 3,4-cyclohexanedimethanol. Preferred glycols include 1,4-butanediol and ethylene glycol. These glycols can be used in combination.

For preparation of the polyester diol (a) having a relatively high molecular weight, an esterification and a deglycolization reaction as the polycondensation may be adopted. The conditions of the reaction may be selected optionally. For example, esterification may be conducted by dehydration under normal pressure, at temperature of about 150° C., followed by further complete dehydration at temperature of 200° to 240° C. The reaction time may be 5 to 10 hours and preferably under reduced pressure during the latter half to reduce the reaction time. Deglycolization reaction may be conducted under reduced pressure of 2 to 0.2 mmHg, at temperature of 200° to 240° C. for 5 to 10 hours.

In this case, it is necessary to use deglycolization reaction catalysts in the deglycolization reaction subsequent to the esterification. Examples of the deglycolization reaction catalysts include titanium compounds such as acetoacetoyl type titanium chelate compounds and organic alkoxy titanium compounds and the like. These titanium compounds can be used in combination. Examples of compounds include diacetoacetoxy oxytitanium (Nippon Chemical Industry Co., Ltd.; Nutsam Titanium), tetraethoxy titanium, tetrapropoxy titanium, tetrabutoxy titanium and the like. The amount of the titanium compound used is 0.001 to 1 part by weight and preferably 0.01 to 0.1 part by weight relative to 100 parts by weight of the polyester diol (a). These titanium compounds may be blended before the esterification, or they may be blended immediately before the deglycolization reaction.

To the polyester diol (a) which has a number-average molecular weight of at least 5,000, preferably at least 10,000 and whose terminal groups substantially are hydroxyl groups are added coupling agents, i.e., diisocyanates, in order to increase its number-average molecular weight.

Although not limited, examples of the coupling agents include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate and isophorone diisocyanate are preferably used in terms of hue of the prepared resins, reactivity at the time of blending polyesters, excellent biodegradability and the like.

The adding amount of these coupling agents are 0.1 to by 5 parts by weight, and preferably 0.5 to 1.5 parts by weight relative to 100 parts by weight of the polyester diol (a). Addition of less than 0.1 part by weight causes insufficient to increase molecular weight by coupling reaction, whereas with more than 5 parts by weight gelation tends to occur.

The addition is preferably performed when the polyester diol is in a uniformly molten state under easily stirrable conditions. Although it is not impossible for the coupling agents to be added to the polyester diol (a) in the solid state and melted in a kneader and mixed through an extruder, this causes often somewhat gelation.

The coupling agents may be dissolved in organic solvents such as hexane, heptane, octane, toluene, xylene and the like in order that the polyester diol (a) and the coupling agent are reacted homogeneously.

(Synthesis of the aliphatic polyester B)

The linear aliphatic polyester homopolymer (B) provided with a linear structure may be obtained in accordance with the description of the above "linear aliphatic polyester copolymer (A)" with the exception that only succinic acid as an acid component and 1,4-butanediol as a glycol component are used. The molar ratio adopted of succinic acid to 1,4-butanediol is 1:1–1.1.

(Synthesis of the aliphatic polyester C)

The aliphatic polyester (C) provided with branched long chains may be obtained in accordance with the description of the above "aliphatic polyester (A)" with the exception that succinic acid as an acid component, 1,4-butanediol as a glycol component and a trifunctional polyol as a third monomer component are used. The molar ratio adopted of succinic acid to 1,4-butanediol is 1:1–1.1. Further, the trifunctional polyol may be used in an amount of 0.25 to 1 mol % relative to 100 mol % of the succinic acid. The polyester polyol (c) obtained which has a number-average molecular weight of at least 5,000, preferably at least 10,000, is then reacted with 0.1 to 5 parts by weight, preferably 0.5 to 1.2 parts by weight of diisocyanate relative to 100 parts by weight, of the polyester polyol (c).

Examples of the trifunctional polyol include, preferably, trimethylol propane and glycerin. If the addition amount of the trifunctional polyol is less than 0.25 mol % relative to 100 mol % of succinic acid, the effect increasing melt tension by branched long chains is only a little. On the other hand, more than 1 mol % of the trifunctional polyol causes gelation and melt fracture to the resin.

(Synthesis of the aliphatic polyester D)

The aliphatic pollester (D) provided with branched longer chains may be obtained in accordance with the description of the above "linear aliphatic polyester copolymer (A)" with the exception that succinic acid as an acid component, 1,4-butanediol as a glycol component and trifunctional isocyanate are used. The molar ratio adopted of succinic acid to 1,4-butanediol is 1:1–1.1. 100 parts by weight of the polyester diol (d) obtained is then reacted with 0.1 to 1 parts by weight of diisocyanate to obtain a resin having a number-average molecular weight of at least 20,000, and then this resin is reacted with 0.1 to 4 parts by weight of trifunctional isocyanate to obtain the aliphatic polyester (D) having a number-average molecular weight of at least 50,000.

Examples of the trifunctional isocyanate include trimethylol propane-hexamethylene diisocyanate-adduct, cyclic hexamethylene diisocyanate trimer, hexamethylene diisocyanate-water-adduct and the like. Organic solvents such as ethyl acetate, hexane, heptane, toluene, xylene and the like can be used as a diluent.

If the addition amount of the trifunctional isocyanate is less than 0.1 part by weight, the effect increasing melt tension by its addition is only a little. On the other hand, more than 4 parts by weight of the trifunctional isocynate causes gelation and melt fracture to the resin.

The number-average molecular weight of the aliphatic polyesters (A), (B), (C) and (D) is at least 50,000. With less than 50,000, it is difficult to obtain good stretched blow molding articles because a closed bottom preform is broken.

When the above mentioned aliphatic polyster composition is used to obtain the stretched blow molding articles according to the present invention, if necessary, antioxidants, thermal stabilizers, UV absorbers, lubricants, waxes, coloring agents, crystalizing promoters and the like can be used concomitantly.

The mixing between the aliphatic polyesters (A), (B), (C) and (D), and the additives therewith may be easily conducted by using a single- or twin-screw extruder.

Figure 3:
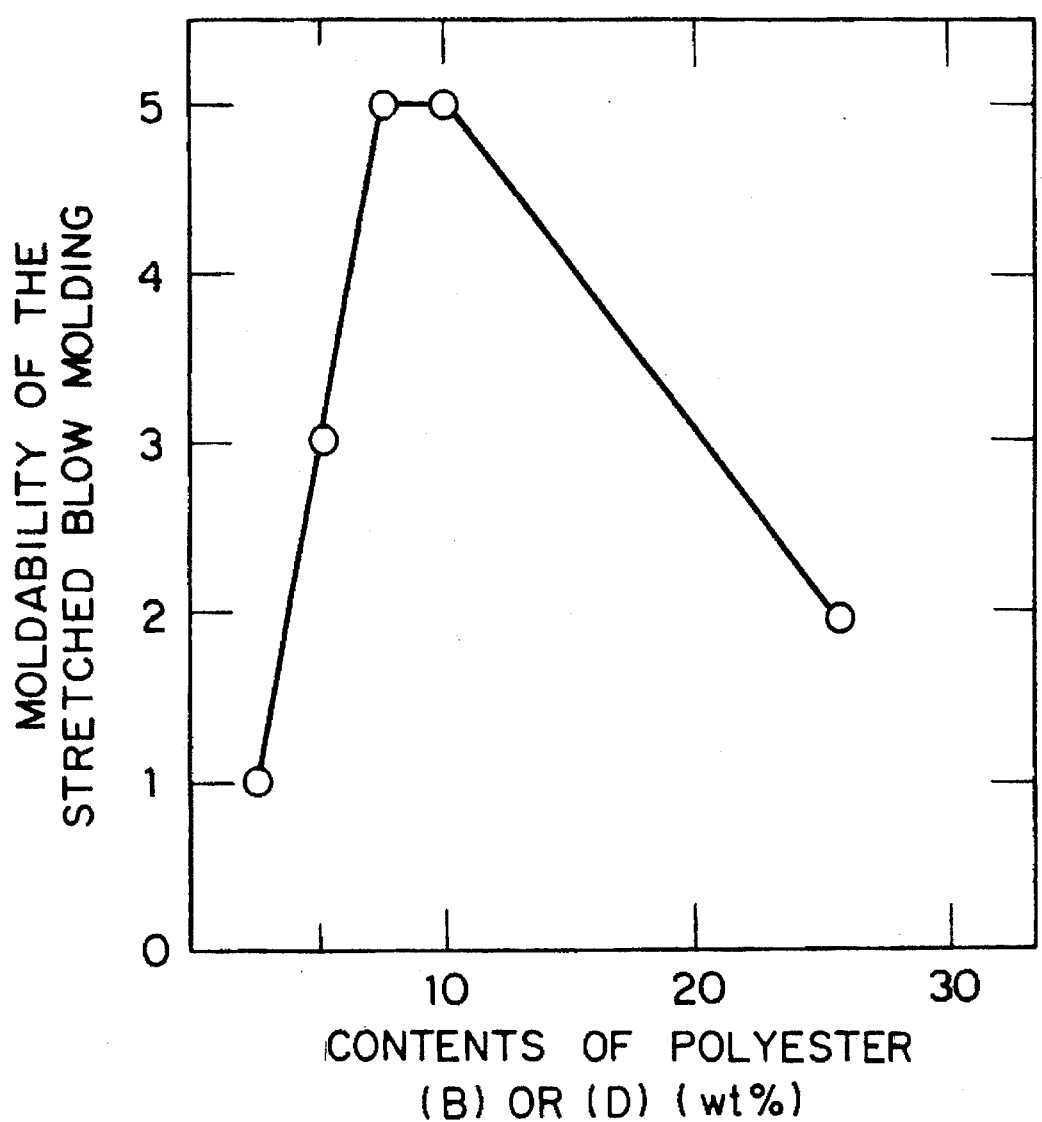
FIG. 3 is a graph representing the relation of the combination ratio of the aliphatic polyester (B) or (D), and the stretched blow moldability using the same.

The combination ratio of the aliphatic polyester (A), with the aliphatic polyester (B), (C) or (D) is as follows:

97.5 to 75 parts by weight, preferably 95 to 85 parts by weight, more preferably 92.5 to 90 parts by weight of the linear aliphatic polyester copolymer (A); and 2.5 to 25 parts by weight, preferably 5.0 to 15 parts by weight, more preferably 7.5 to 10 parts by weight of the aliphatic polyester (B) (C) or (D). With less than 2.5 parts by weight of the aliphatic polyester (B), (C) or (D), and more than 25 parts by weight, it is difficult to obtain good stretched blow molding articles because a closed bottom preform is broken. The use of the aliphatic polyester (B), (C) or (D) in a weight ratio of 7.5–10 parts by weight makes the moldability of the articles very good (see FIG. 3).

Further, the aliphatic polyesters (B), (C) and (D) having a higher molecular weight and lower melt flow rate (MFR) than that of the aliphatic polyester (A) are preferred.

The composition of the present invention has a melting point of at least 70° C. With less than 70° C., it is not sufficient for practical use.

Figure 2:
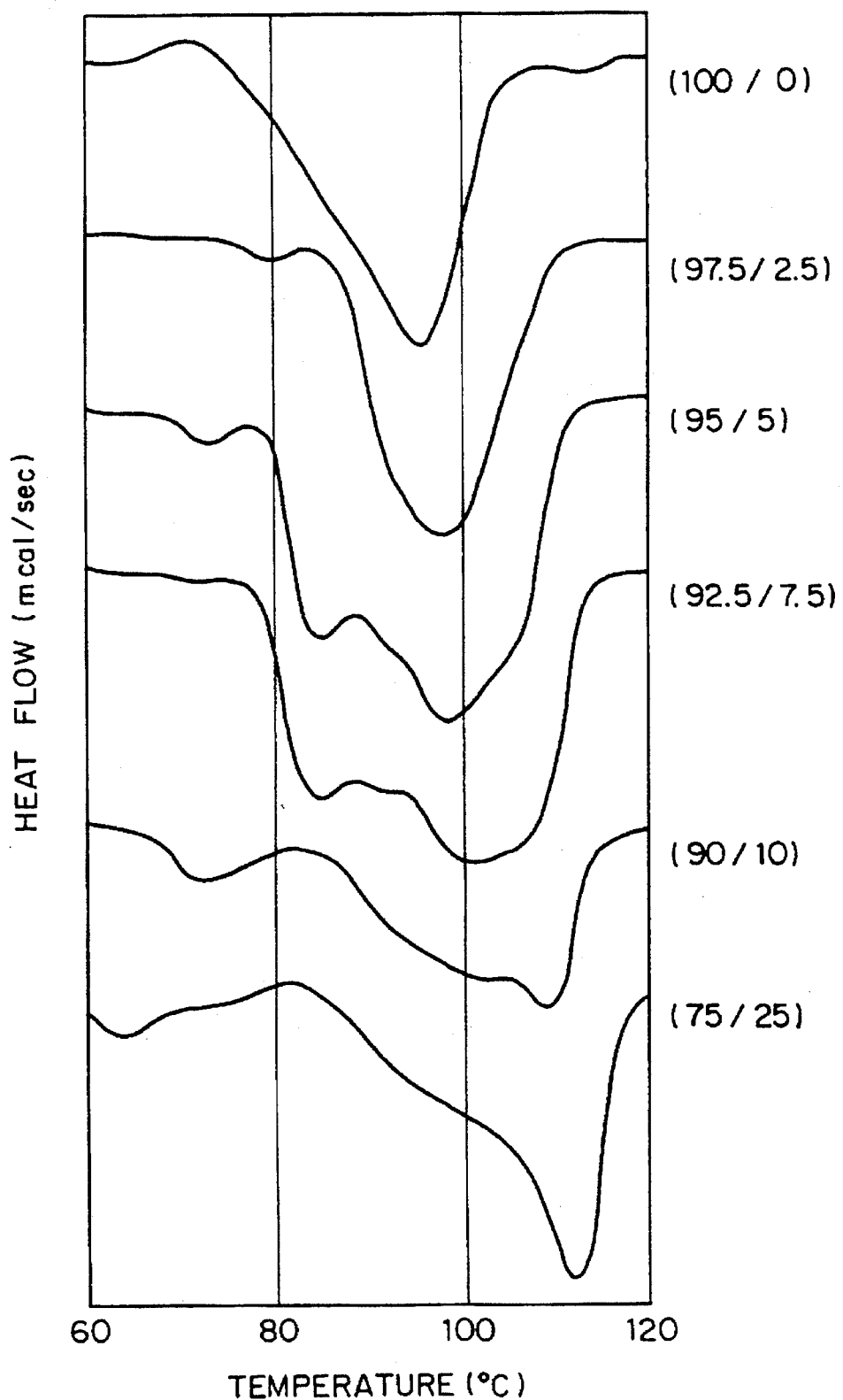
FIG. 2 is a DSC curve of the composition of the present invention (including an aliphatic polyester (D1)) and the base polymer (A2) which is used to obtain the invention composition in a range of combination ratios.

The process for producing the stretched blow molding articles according to the present invention is exemplified by a cold parison technique and a hot parison technique. An example of the cold parison technique is as follows:

First, a preform is obtained by using an injection molding machine. The preform is cooled to room temperature and then re-heated to the stretch temperature with an IR heater which is ready for conducting the stretched blow molding.

ing a heat of fusion of 40 joule/g or less and low crystallinity is preferred (see FIG. 1). Further, a composition including polyester provided with a branched longer chain structure (for example, polyester (D)) is more preferable because it has a broad melting point of 80° to 120° C. (see FIG. 2).

EXAMPLES

The present invention will be illustrated with reference to the following Examples and Comparative Examples, but the invention is not intended to be limited only thereto. In the following Examples, the average-molecular weight was measured by a Shodex GPC System-11 (Showa Denko, gel permeation chromatography, sample column 800P, 80M×2,

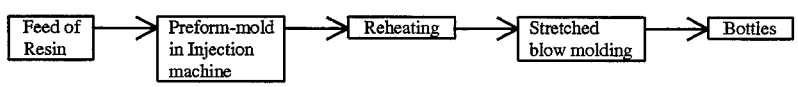

Examples of the conditions of the injection molding and that of the stretched blow molding are shown in Table 1 and Table 2, respectively.

TABLE 1

| Injection molding conditions to produce preform | |
| --- | --- |
| Injection Temperature | 130–150° C. |
| Injection Speed | 5–50 mm/sec |
| Back pressure | 30–70 kgf/cm$^2$ |
| Die Temperature | 20° C. |
| Cooling Time | 10–20 sec |

TABLE 2

| Stretch blow molding conditions | |
| --- | --- |
| Stretch Ratio (MD) | 1.1–3.0 fold |
| Stretch Ratio (TD) | 1.5–3.0 fold |
| Reheating Time | 50–60 sec |
| Stabilization Time | 25–35 sec |
| Stretch Pressure | 4–7 kgf/cm$^2$ |
| Stretch Time | 0–0.5 sec |
| Primary Blowing Pressure | 0–5 kgf/cm$^2$ |
| Primary Blowing Time | 0–1.5 sec |
| Secondary Blowing Pressure | 20 kgf/cm$^2$ |
| Secondary Blowing Time | 1–3 sec |
| Stretch temperature | 70–100° C. |

On the other hand, the hot parison technique for producing the stretched blow molding articles according to the present invention is exemplified as follows:

A preform having a diameter of 20 mm, length of 50 mm and thickness of 3.4 mm is obtained by using an injection molding machine having a cylinder temperature of 140° C. The preform is gradually cooled to 80° C., and then stretch blow molded under the conditions of a longitudinal stretch rod speed of 0.15 m/sec, a primary blowing pressure of 5 kgf/cm$^2$, a primary blowing time of 0.3 sec, a secondary blowing pressure of 25 kgf/cm$^2$ and a secondary blowing time of 7 sec to obtain a stretched blow molding article (bottle) having a height of 120 mm, diameter of 50 mm and volume of 200 cc.

The molding of the stretched blow molding articles according to the present invention comprises the step of reheating of a preform of a closed bottom preform from room temperature to 70°–100° C. Therefore, polyester havreference column 800R×2) using chloroform as a medium. The measurement conditions of a column temperature of 40° C., a flow rate of 1.0 ml/min and a polymer concentration of 0.1 wt % were adopted. The detectors used were RI (Shodex). A calibration curve was drawn using a PMMA standard sample (Shodex Standard M-75, Showa Denko).

The melt flow rate (MFR) was measured by the JIS 7210 method (190° C., 2.16 kg and 6 min) as the standard measurement of polyethylene.

The evaluation of the articles obtained was conducted as shown in the following table 3.

TABLE 3

| Thickness | Thickness Measurer |
| --- | --- |
| Haze | Haze Meter |
| Oxygen Permeability | Pressure Differential Gas Permeability Measuring Device |
| Water Vapor Permeability | JIS Z0222 |
| Flexural Modulus | JIS P8125 |
| Impact Strength | Drop-Weight Impact Tester |
| Crack Initiation Energy | Measurement of Maximum Load (5° C.) |

The moldability of stretched blow molding articles are evaluated on 20 pieces of bottles and are ranked from 0 to 5 as follows:

Rank 5: Excellent moldability;
Rank 4: Practicable molding, but somewhat irregular for bottle thickness;
Rank 3: practicable molding, but observable often irregular thickness;
Rank 2: A little preform can be molded;
Rank 1: Few preforms can be molded; and
Rank 0: Molding is impossible.
Biodegradability zest is carried out as follows:
Bottles are buried in horizontally 100 mm underground with moist soil inside them, and kept room temperature of about 20° to 28° C. After passage of several weeks or months, they are picked up, washed with water and dried and weight-loss is observed.

Unless otherwise indicated, all parts, percents, ratios and the like are by weight.

(Example 1)

(Synthesis of an aliphatic polyester copolymer (A1) provided with a linear structure)

An 80 L reactor was purged with nitrogen, then 17.4 kg of 1,4-butanediol, 17.3 kg of succinic acid and 5.4 kg of adipic acid (the molar ratio of succinic acid/adipic acid was 80:20) were charged in it. After the temperature was elevated under a nitrogen stream, esterification by dehydration condensation was carried out for 3.5 hr at 190°–210° C., and after ceasing the nitrogen charge, for 3.5 hr further under reduced pressures of 20–2 mmHg. A sample collected had an acid value of 9.6 mg/g, a number-average molecular weight (Mn) of 6,100 and a weight-average molecular weight (Mw) of 12,200. Subsequently, 2.0 g of tetraisopropoxy titanium, a catalyst, was added at normal pressures under a nitrogen stream. The temperature was elevated to carry out a deglycolization reaction at temperatures of 210°–220° C. under reduced pressures of 15–0.2 mmHg for 6.5 hr. A sample collected had a number-average molecular weight (Mn) of 26,000 and a weight average molecular weight (Mw) of 69,600. The theoretical yield of resulting polyester diol of (a1) was 32.6 kg except condensated water. Then, 34 g of Irganox 1010 (Ciba-Geigy) as an antioxidant and 34 g of calcium stearate as a lubricant were added, and the mixture was further stirred for 30 min.

310 g of hexamethylene diisocyanate (0.95 part by weight) was added to the reactor containing 32.6 kg of the polyester diol (a1) to perform a coupling reaction for 1 hr at 160°–190° C. The viscosity was rapidly increased, but no gelation occurred. The resulting reaction product was put into a kneader-extruder machine and extruded into water, and cut by a cutter into pellets. The aliphatic polyester (A1) obtained after drying in a vacuum at 70° C. for 6 hr had a actual yield of 30.0 kg.

The obtained linear polyester copolymer (A1) was a slightly ivorylike white and had a melting point of 95.8° C., a heat of fusion (ΔH) of 39 Joule/g, a number-average molecular weight (Mn) of 70,440, a weight-average molecular weight (Mw) of 153,560 and a MFR (190° C.) of 11.8 g/10 min.

(Synthesis of an aliphatic polyester homopolymer (B1) provided with a linear structure)

An 80 L reactor was purged with nitrogen, then 18.3 kg of 1,4-butanediol and 22.4 kg of succinic acid were charged in it. After the temperature was elevated under a nitrogen stream, esterification by dehydration condensation was carried out for 3.5 hr at 192°–220° C. and after ceasing the nitrogen charge, for 3.5 hr further under reduced pressures of 20–2 mmHg. A sample collected had an acid value of 9.2 mg/g, a number-average molecular weight (Mn) of 5,160 and a weight-average molecular weight (Mw) of 10,670. Subsequently, 3.4 g of tetraisopropoxy titanium a catalyst, was added at normal pressures under a nitrogen stream. The temperature was elevated to carry out a deglycolization reaction at temperatures of 215°–220° C. under reduced pressures of 15–0.2 mmHg for 5.5 hr. A sample collected had a number-average molecular weight (Mn) of 25,200 and a weight average molecular weight (Mw) of 65,400. The theoretical yield of resulting polyester diol (b1) was 33.9 kg except condensated water. Then, 34 g of Irganox 1010 (Ciba-Geigy) as an antioxidant, 34 g of phosphorous acid as a decoloring agent and 34 g of calcium stearate as a lubricant were added, and the mixture was further stirred for 30 min.

356 g of hexamethylene diisocyanate (1.05 parts by weight) was added to the reactor containing 33.9 kg of the polyester diol (b1) to perform a coupling reaction for 1 hr at 190°–200° C. The viscosity was rapidly increased, but no gelation occurred. The resulting reaction product was put into a kneader-extruder machine and extruded into water, and cut by a cutter into pellets. The aliphatic polyester (B1) obtained after drying in a vacuum at 90° C. for 6 hr had a actual yield of 32.0 kg.

The obtained linear polyester homopolymer (B1) was white and had a melting point of 115.5° C., a heat of fusion (ΔH) of 78 Joule/g, a number-average molecular weight (Mn) of 69,800, a weight-average molecular weight (Mw) of 157,500 and a MFR (190° C.) of 3.0 g/10 min.

(Preparation of an aliphatic polyester composition [1] according to the present invention).

The linear aliphazic polyester copolymer (A1) and the linear polyester homopolymer (B1) were combined to obtain an aliphatic polyester composition, and the physical properties thereof were evaluated as shown in Table 4.

The polyesters (A1) and (B1) were firstly combined in an A1/B1 ratio of 90/10, 75/25 and 50/50, respectively, then dry blended to obtain pellets of 10 kg. Next, the pellets were automatically fed into a kneader-extruder machine heated to 200° C. provided with a twin kneader blade (manufactured by Kasamatsukako Laboratory), and kneaded homogeneously. The resulting product was formed into pellets by water cooling strands which were prepared by using a single-screw extruder with a cylinder having a diameter of 35 mm Ø heated to 190°–200° C. and then cutting the strands using a rotating cutter. About 7 kg of the white pellets considered to be good product were collected, vacuum dried for 3 hours at 70° C. and packed in polyethylene bag and stored in a metal can.

(Injection molding of a preform for application to a cold parison technique)

A closed bottom preform having a diameter of 20 mm, a length of 50 mm, a thickness of 3.4 mm and a weight of about 30 g was prepared by an injection molding machine. The conditions of the injection molding were an injection temperature of 130°–140° C., injection speed of 10 mm/sec, back pressure of 45 kg/cm$^2$, die temperature of 20° C. and cooling time of 20 sec. It was found that the injection moldability was very good.

(Preparation of the bottles by stretched blow molding in a cold parison technique)

The preform of a closed bottom preform was reheated from room temperature to 74°–87° C. (stretch temperature) for 1 min by an IR heater and pressurized by air to obtain a stretched blow molding article having a volume of about 350 cc. The measurement conditions and evaluation of the article were shown in Table 4. In the compositions which had a combination ratio (polyester (A1)/polyester (B1)) of 100/0 and 50/50, it was difficult to form the articles. Although the 75/25 composition could be formed, the article was only a little good because of its irregular thickness. On the other hand, the 90/10 composition had good stretched blow moldability.

TABLE 4

| Resin Combination Polyester A1/ Polyester B1 (Weight Ratio) | Physical Properties of the Composition | | | | | | | |
|---|---|---|---|---|---|---|---|---|
| | Molecular Weights | | | MFR g/ 10 min | M.P. (°C.) | Recryst. Temp. (°C.) | Preform Molding | |
| | Mn | Mw | Mw/Mn | | | | Injec. Temp (°C.) | Weight (g) |
| 100/0 | 70.440 | 158.560 | 2.18 | 11.8 | 95.8 | 70.3 | 130 | 30.63 |
| 90/10 | 66.150 | 152.140 | 2.29 | 11.5 | 108.6 | 76.3 | 140 | 30.80 |
| 75/25 | 68.230 | 168.920 | 2.47 | 9.8 | 111.3 | 81.7 | 140 | 30.85 |
| 50/50 | 55.090 | 162.080 | 2.94 | 8.2 | 115.6 | 85.5 | 140 | 30.98 |
| 0/100 | 69.800 | 157.500 | 2.25 | 3.0 | 115.6 | 88.4 | 140 | 31.02 |

| Combination Polyester A1/ Polyester B1 (Weight Ratio) | Stretched Blow Molding Conditions | | | | | | Evaluation | |
|---|---|---|---|---|---|---|---|---|
| | PF Temp. (°C.) | Heat Time (s) | Stabil. Time (s) | Stretch Press. kg/cm²-s | Prim. Blow Press. kg/cm²-s | Sec. Blow press. kg/cm²-s | Injection Moldability | Stretch-Blow Moldability |
| 100/0 | 74 | 52 | 30 | 6-0.2 | 4-2.0 | 20-1.0 | good | rank 3 |
| 90/10 | 82 | 59 | 28 | 6-0.1 | 4-0.9 | 20-3.0 | good | rank 5 |
| 75/25 | 84 | 58 | 30 | 6-0.1 | 4-1.0 | 20-2.0 | good | rank 2 |
| 50/50 | 87 | 60 | 35 | 6-0.1 | 4-1.5 | 20-1.0 | good | rank 1 |
| 0/100 | 90 | 60 | 40 | 6-0.1 | 4-1.5 | 20-1.0 | good | rank 0 |

The properties of stretched blow bottles having composition (A1/B1) of (90/10) were measured. The thickness of bottles body was about 0.6 mm, in this case the stretch ratio was about 1.3 fold (MD) and about 2.8 fold (TD).

The properties measured of the bottle body (MD) are as follows:

Haze: 38%

Oxygen Permeability: 37 ml/m².day

Water Vapor Permeability: 15 g/m².day

Flexural Modulus: 1,598 MPa

Crack Initiation Energy of Drop-Weight Impact Test: 380N

The biodegradability test of bottles showed that weight loss of bottles were 8.3% after 6 weeks, 10% after 8 weeks, 11% after 9 weeks and 20% after 13 weeks, these results meaning practically enough biodegradability.

(Example 2)

(Synthesis of an aliphatic polyester copolymer (A2) provided with a linear structure)

Example 1 was repeated to obtain the linear aliphatic polyester copolymer (A2) with the exception that the molar ratio of succinic acid to adipic acid of 80:20 was adopted and 0.95 part by weight of hexamethylene diisocyanate as the coupling agent was used. Polyester (A2) was obtained as a white pellet and had a melting point of 94.4° C., a number-average molecular weight (Mn) of 62,770, a weight-average molecular weight of 236,070 and an MFR (190° C.) of 14.0 g/10 min.

(Synthesis of an aliphatic polyester (C1) provided with a branched long chain structure)

An 80 L reactor was purged with nitrogen, then 17.7 kg of 1,4-butanediol, 22.1 kg of succinic acid and 126 g of trimethylol propane (0.5 mol %) were charged in it. After the temperature was elevated under a nitrogen stream, esterification by dehydration condensation was carried out for 3.5 hr at 190°–210° C., and after ceasing the nitrogen charge, for 5.5 hr further under reduced pressures of 20–2 mmHg. A sample collected had an acid value of 12 mg/g, a number-average molecular weight (Mn) of 6,800 and a weight-average molecular weight (Mw) of 13,500. Subsequently, 2.0 g of tetraisopropoxy titanium, a catalyst, was added at normal pressures under a nitrogen stream. The temperature was elevated to carry out a deglycolization reaction at temperatures of 210°–220° C. under reduced pressures of 15–0.7 mmHg for 4.5 hr. A sample collected had a number-average molecular weight (Mn) of 36,450 and a weight average molecular weight (Mw) of 83,400. The theoretical yield of resulting polyester polyol was 35.4 kg except condensated water.

3.5 g of phosphorous acid as a decoloring agent, then 35.4 g of Irganox B225 (Ciba-Geigy) as an antioxidant, and 35.4 g of calcium stearate as a lubricant were added to the reactor containing 35.4 kg of the polyester polyol, and the mixture was further stirred for 30 min.

Then, 319 g of hexamethylene diisocyanate (0.90 parts by weight) was added to the reactor to perform a coupling reaction for 2 hr at 180°–200° C. The viscosity was rapidly increased, but no gelation occurred. The resulting reaction product was dropped from the reactor bottom through a valve thereof into a kneader, and extruded into water by an extruder with a cylinder temperature of 190°–200° C., and cut by a cutter into pellets. The aliphatic polyester (C1) obtained after drying in a vacuum at 90° C. for 6 hr had a yield of 29.0 kg.

The obtained polyester (C1) provided with a branched long chain structure was a white pellet and had a melting point of 114° C., a heat of fusion ($\Delta H$) of 80 Joule/g, a number-average molecular weight (Mn) of 55,100, a weight-average molecular weight (Mw) of 221,100 and a MFR (190° C.) of 5.4 g/10 min.

As described in Example 1, the aliphatic polyesters (A2) and (C1) were combined by using a kneader-extruder with a weight ratio (A2:C1) of 90:10.

(Stretched blow molding in accordance with a cold parison technique)

A preform of a losed-end parison was prepared by injection molding in accordance with Example 1. The moldability thereof was good. Then, stretched blow molding was conducted in accordance with Example 1. As a result, it was possible to mold the article, although the evaluation of the moldability showed rank 4 because a part of the parison was broken and articles ins an irregular thickness were observed. The results obtained were shown in Table 5. Also, an evaluation of the base polymer (polyester (A2) and polyester (C1)) was conducted. Further, the viscosity of the resin (190° C.) was measured with rota-viscometer.

containing 36.4 kg of the polyester diol (d1) at 160° C., and the mixture was further stirred for 30 min.

Then, 291 g of hexametbylene diisocyanate (0.8 part by weight) was added to the reactor and stirred for 20 min at 160° C., and then 291 g of trimethylol propane-hexamethylene diisocyanate.adduct (manufactured by Nihon Polyurethane Kogyo K.K., 75% by weight as ethyl acetate solution, Colonate HL) was further added thereto to perform a coupling reaction for 2 hr at 180°–200° C. The viscosity was rapidly increased, but no gelation occurred. The resulting reaction product was extruded into water by an

TABLE 5

| Sample (Weight ratio) | MFR | Viscosity (190° C.) | Mn | Mw | Mw/Mn | M.P. (°C.) | Recryst. Temp (°C.) | Stretch-Blow Moldability |
| --- | --- | --- | --- | --- | --- | --- | --- | --- |
| (Example 2) | | | | | | | | |
| Polyester A2/C1 = 90/10 | 6.1 | 29,280 | 64,360 | 184,640 | 2.86 | 111.6 | 91.3 | rank 4 |
| (Base Polymer) | | | | | | | | |
| Polyester (A2) | 14 | — | 62,770 | 236,070 | 3.76 | 94.4 | 65.4 | rank 1 |
| Polyester (C1) | 5.4 | 23,200 | 51,100 | 221,100 | 4.01 | 114 | — | rank 0 |

(Examples 3 to 6)

In Examples 3 to 6, A2 of Example 2 was used as the aliphatic polyester copolymer provided with a linear structure.

(Synthesis of an aliphatic polyester (D1) provided with a branched longer chain structure)

An 80 L reactor was purged with nitrogen, then 20.0 kg of 1,4-butanediol and 25.0 kg of succinic acid were charged in it. After the temperature was elevated under a nitrogen stream, esterification by dehydration condensation was carried out for 3.5 hr at 190°–220° C., and alter ceasing the nitrogen charge, for 2.5 hr further under reduced pressures of 20–1.2 mmHg. A sample collected had an acid value of 23.1 mg/g. Subsequently, 2.0 g of tetraisopropoxy titanium, a catalyst, was added at normal pressures under a nitrogen stream. The temperature was elevated to carry out a deglycolization reaction at temperatures of 210°–220° C. under reduced pressures of 1.5–0.7 mmHg for 4.5 hr. A sample collected had a number-average molecular weight (Mn) of 24,000 and a weight average molecular weight (Mw) of 47,740. The theoretical yield of resulting polyester diol (d1) was 36.4 kg except condensate water.

9 g of phosphorous acid as a decoloring agent, 36 g of Irganox B225 (Ciba-Geigy) as an antioxidant, and 36 g of calcium stearate as a lubricant were added to the reactor extruder through a kneader, and cut by a cutter into pellets. The aliphatic polyester (D1) obtained after drying in a vacuum at 90° C. for 6 hr had a yield of 32.0 kg.

The obtained polyester (D1) provided with a branched long chain structure was a white pellet and had a melting point of 116.1° C., a heat of fusion ($\Delta$H) of 79 Joule/g, a number-average molecular weight (Mn) of 65,130, a weight-average molecular weight (Mw) of 186,440 and a MFR (190° C.) of 3.5 g/10 min.

As described in Example 1, the aliphatic polyesters (A2) and (D1) were combined by using a kneader-extruder machine with a weight ratio (A2:D1) of 90:10, 92.5:7.5, 95:5 and 97.5:2.5, respectively.

(Stretched blow molding in accordance with a cold parison technique)

The evaluation of the composition of Examples 3 to 6 was conducted in accordance with Example 1. The results were shown in FIGS. 2 and 3 and Table 6. The injection moldability of the preform of the parison was all good. The stretched blow moldability of 90:10 composition and 92.5:7.5 composition (Examples 3 and 4, respectively) were excellent.

TABLE 6

| Sample (Weight ratio) | MFR | Viscosity (190° C.) | Mn | Mw | Mw/Mn | M.P. (°C.) | Recryst. Temp (°C.) | Stretch-Blow Moldability |
| --- | --- | --- | --- | --- | --- | --- | --- | --- |
| (Example 3) | | | | | | | | |
| Polyester A2/D1 = 90/10 | 14.9 | 10,080 | 54,640 | 140,770 | 2.57 | 109.1 | 82.0 | rank 5 |
| (Example 4) | | | | | | | | |
| Polyester A2/D1 = 92.5/7.5 | 15.0 | 8,480 | 65,630 | 140,910 | 2.14 | 102.6 | 80.3 | rank 5 |

TABLE 6-continued

| Sample (Weight ratio) | MFR | Viscosity (190° C.) | Mn | Mw | Mw/Mn | M.P. (°C.) | Recryst. Temp (°C.) | Stretch-Blow Moldability |
|---|---|---|---|---|---|---|---|---|
| (Example 5) | | | | | | | | |
| Polyester A2/D1 = 95/5 | 14.5 | 9,120 | 66,650 | 142,690 | 2.14 | 98.0 | 79.1 | rank 3 |
| (Example 6) | | | | | | | | |
| Polyester A2/D1 = 97.5/2.5 | 17.3 | 8,960 | 61,540 | 139,220 | 2.26 | 98.0 | 75.4 | rank 1 |
| (Base Polymer) | | | | | | | | |
| A2 | 14.0 | — | 62,770 | 236,070 | 3.76 | 94.4 | 65.4 | rank 1 |
| D1 | 3.50 | — | 65,130 | 186,440 | 2.86 | 116.1 | 93.8 | rank 0 |

The biodegradability test of stretched blow bottles produced by Example 3 of the composition (A2/D1=90/10) was carried out, and showed that weight loss of bottles in moist soil was 8.5% after 2 months, 32.0% after 3 months and 42.8% after 3.5 months.

(Examples 7 to 8)

It was expected that the MFR and molecular weight of the polyester (D) type affected the moldability of the composition. Therefore, the present Examples were conducted in order to confirm that effect.

(Synthesis of aliphatic polyesters (D2) and (D3) provided with a branched longer chain structure)

The aliphatic polyesters (D2) and (D3) were synthesized by repeating Example 3 with the exception that 0.70 part by weight (D2) or 0.85 part by weight (D3) of trimethylol propane.hexamethylene diisocyanate.adduct was used.

The compositions were prepared in accordance with Example 1. The weight ratio of A2/D2 or D3 was 90:10. The injection moldability of the compositions was very good. Also, the stretched blow moldability was excellent in each composition such that rank 3 was shown. The composition of Example 8 in which polyester (D3) having a MFR of as little as 2.5 g/10 min, a number-average molecular weight of 67,600 and a weight-average molecular weight of as high as 198,750 was combined, gave the best results with respect to the rate of non-defective articles than that of Example 7, in which polyester D2 having a relative low molecular weight was combined. The results obtained were shown in Table 7.

(Example 9)

The hot parison technique stretched blow molding was conducted. The composition used included linear polyester A2 and polyester with longer branch D3 of Example 8 (weight ratio A2/D3=90/10).

A closed-end parison having a diameter of 20 mm, a length 50 mm and a thickness Of 3.4 mm was prepared by an injection molding machine at the injection temperature of 130°–150° C. The preform obtained was gradually cooled to a surface temperature of 80° C., then it was stretch-blow molded with conditions of a longitudinal stretch-rod speed of 0.15 m/s, a primary blow pressure of 5 kgf/cm$^2$, a primary blow time of 0.3 s, a secondary blow pressure of 25 kgf/cm$^2$ and a secondary blow time of 7 s to obtain a stretched blow molding article (bottle) having a height of 120 mm, a diameter of 50 mm and a volume of 200 cc.

It was found that the stretched blow moldability was very good (rank 5).

(Examples 10 to 11)

(Synthesis of polyester copolymers (A3) and (A4) provided with a linear chain structure)

The polyesters (A3) and (A4) were prepared in accordance with Example 1 with the exception that the molar ratio of succinic acid to adipic acid was 90:10 (A3) and 70:30 (A4), respectively. The evaluation of the physical properties of the polyesters (A3) and (A4) was conducted, and the results obtained were as shown in below.

TABLE 7

| Sample (Weight ratio) | MFR g/10 min | Viscosity (190° C.) | Mn | Mw | Mn/Mw | M.P. (°C.) | Recryst. Temp (°C.) | Stretch-Blow Moldability |
|---|---|---|---|---|---|---|---|---|
| (Example 7) | | | | | | | | |
| Polyester A2/D2 = 90/10 | 14.9 | 8,576 | 63,960 | 145,740 | 2.27 | 107.0 | 83.1 | rank 5 |
| (Example 8) | | | | | | | | |
| Polyester A2/D3 = 90/10 | 13.5 | 9,760 | 63,310 | 141,890 | 2.24 | 107.0 | 82.7 | rank 5 |
| (Base Polymer) | | | | | | | | |
| D2 | 9.80 | 16,480 | 60,380 | 177,500 | 2.53 | 115.6 | 94.8 | rank 0 |
| D3 | 2.50 | 56,400 | 67,600 | 198,750 | 3.29 | 114.2 | 91.8 | rank 0 |

|  | Example 10 | Example 17 |
| --- | --- | --- |
| Polyester | (A3) | (A4) |
| Succinic acid/ Adipic acid (mol %) | 90/10 | 70/30 |
| Melting point (°C.) | 107 | 82 |
| Heat of fusion (Joule/g) | 62 | — |
| MFR (g/10 min) | 8.4 | 8.5 |
| Number-average molecular weight (Mn) | 69,800 | 72,200 |
| Weight-average molecular weight (Mw) | 172,000 | 168,000 |
| S.B. moldability | rank 1 | rank 0 |

The cold parison technique stretched blow molding was conducted. The composition used was prepared by using a kneader-extruder and included polyester A3 or A4 and polyester D3 of Example 8 (weight ratio A3 or A4/D3=90/10).

The moldability of the composition having A3/D3=90/10 was good, indicating rank 5.

On the other hand, the moldability of the composition having A4/D3=90/10 was rank 4, because the polyester (A4) had a lower melting point.

(Example 12)

(Synthesis of polyester copolymer (A5) provided with a linear chain structure)

An 80 L reactor was purged with nitrogen, then 17.3 kg of ethylene glycol, 23.9 kg of succinic anhydride and 8.6 kg of adipic acid (the molar ratio of succinic acid/adipic acid was 90:10) were charged in it. After the temperature was elevated under a nitrogen stream, esterification by dehydration condensation was carried out for 3.5 hr at 150°–210° C., and after ceasing the nitrogen charge, for 3.5 hr further under reduced pressures of 20–2 mmHg. A sample collected had an acid value of 24 mg/g, a number-average molecular weight (Mn) of 4,300 and a weight-average molecular weight (Mw) of 11,400. Subsequently, 2.0 g of tetraisopropoxy titanium, a catalyst, was added at normal pressures under a nitrogen stream. The temperature was elevated to carry out a deglycol-reaction at temperatures, of 210°–220° C. under reduced pressures of 15–0.2 mmHg for 19 hr. A sample collected had a number-average molecular weight (Mn) of 28,500 and a weight average molecular weight (Mw) of 68,700. The theoretical yield of resulting polyester diol (a5) was 34.6 kg except condensated water. Then, 4.3 g of phosphorous acid as a decoloring agent, 34 g of Inganox 1010 (Ciba-Geigy) as an antioxidant and 34 g of calcium stearate as a lubricant were added, and the mixture was further stirred for 30 min.

450 g of hexamethylene diisocyanate (1.3 parts by weight) was added to the reactor containing 34.6 kg of the polyester diol (a5) to perform a coupling reaction for 3 hr at 160°–190° C. The viscosity was rapidly increased, but no gelation occurred. The resulting reaction product was extruded into water, and cut by a cutter into pellets. The aliphatic polyester copolymer (A5) obtained after drying in a vacuum at 70° C. for 6 hr had a yield of 30.0 kg.

The obtained linear polyester copolymer (A5) was a slightly ivorylike white and had a melting point of 92° C., a heat of fusion (ΔN) of 56 Joule/g, a number-average molecular weight (Mn) of 63,600, a weight-average molecular weight (Mw) of 302,100 and a MFR (190° C. of 12.3 g/10 min.

(Synthesis of an aliphatic polyester (D4) provided with a branched longer chain structure)

An 80 L reactor was purged with nitrogen, then 20.0 kg of 1,4-butanediol and 25.0 kg of succinic acid were charged in it. After the temperature was elevated under a nitrogen stream, esterification by dehydration condensation was carried out for 3.5 hr at 190°–220° C., and after ceasing the nitrogen charge, for 2.5 hr further under reduced pressures of 20–1.2 mmHg. A sample collected had an acid value of 12.3 mg/g. Subsequently, 2.0 g of tetraisopropoxy titanium, a catalyst, was added at normal pressures under a nitrogen stream. The temperature was elevated to carry out a deglycolization reaction at temperatures of 210°–220° C. under reduced pressures of 1.5–0.7 mmHg for 4.5 hr. A sample collected had a number-average molecular weight (Mn) of 25,850 and a weight average molecular weight (Mw) of 53,600. The yield of resulting polyester diol (d4) was 36.4 kg except condensated water.

9 g of phosphorous acid as a decoloring agent, 36 g of Irganox B225 (Ciba-Geigy) as an antioxidant, and 36 g of calcium stearate as a lubricant were added to the reactor containing 36.4 kg of the polyester diol (d4) at 160° C., and the mixture was further stirred for 30 min.

Then, 237 g of hexamethylene diisocyanate (0.65 part by weight) was added to the reactor and stirred for 20 min at 160° C., and then 291 g of cyclic hexamethylene diisocyanate trimer (manufactured by Nihon Polyurethane Kogyo K.K., 0.95 part by weight) was further added thereto to perform a coupling reaction for 2 hr at 180°–200° C. The viscosity was rapidly increased, but no gelation occurred. The resulting reaction product was extruded into water by an extruder with a cylinder temperature of 190°–200° C. through a kneader-extruder, and cut by a cutter into pellets. The aliphatic polyester (D4) obtained after drying in a vacuum at 90° C. for 6 hr had a yield of 28.0 kg.

The obtained polyester (D4) provided with a branched longer chain structure was a white pellet and had a melting point of 114° C., a heat of fusion (ΔH) of 77 Joule/g, a number-average molecular weight (Mn) of 74,300, a weight-average molecular weight (Mw) of 252,200 and a MFR (190° C.) of 1.77 g/10 min.

As described in Example 1, the aliphatic polyesters (A5) and (D4) were combined by using a kneader-extruder with a weight ratio (A5:D4) of 90:10.

(Stretched blow molding in accordance with a cold parison technique)

The evaluation of the moldability of the composition of Example 12 was conducted in accordance with Example 1. The injection moldability for preparing the closed bottom preform was very good. Further, the stretched blow moldability was rank 5.

The stretched blow molding articles according to the present invention prepared by using an aliphatic polyester composition which has sufficiently high molecular weight for practical use have excellent mechanical properties represented by heat stability, tensile strength and gas barrier properties. Further, the stretched blow molding articles according to the present invention can be rapidly decomposed by microorganisms and the like, i.e., they are biodegradable as one means of waste disposal in compost and in soil, in the sea, in water with activated sludge and the like after the use thereof.

Furthermore, the stretched blow molding articles according to the present invention generate a half of heat of combustion and it is lower than polyethylene and polypropylene even when disposed into an incinerator.

Therefore, the stretched blow molding articles according to the present invention can be used for containers of detergents, cosmetic bottles, beverage bottles and the like, and industrial parts.

While the invention has been described in detail and with reference to specific embodiments thereof, it will be apparent to one of ordinary skill in the art that various changes and modifications can be made therein without departing from the spirit and scope thereof.

What is claimed is:

1. A biodegradable stretched blow molded article prepared by using a biodegradable, aliphatic polyester blend composition (1) having a melting point of at least 70° C. comprising:

97.5 to 75 parts by weight of a first aliphatic polyester copolymer having a number-average molecular weight of at least 50,000 which is obtained by reacting 100 parts by weight of a polyester diol (a) with 0.1 to 5 parts by weight of diisocyanate, wherein the polyester diol (a) is obtained by conducting a polycondensation of 1 mol of an acid component consisting of 70 to 90 mol % of succinic acid and 10 to 30 mol % of adipic acid, with 1 to 1.1 mols of glycol; and 2.5 to 25 parts by weight of a second aliphatic polyester having a number-average molecular weight of at least 50,000 which is obtained by reacting 100 parts by weight of a polyester diol (b) with 0.1 to 5 parts by weight of diisocyanate, wherein the polyester diol (b) is obtained by conducting a polycondensation of 1 mol of succinic acid with 1 to 1.1 mols of 1,4-butanediol.

2. A biodegradable, stretched blow molded article prepared by using a biodegradable aliphatic polyester blend composition (2) having a melting point of at least 70° C. comprising:

97.5 to 75 parts by weight of a first aliphatic polyester copolymer having a number-average molecular weight of at least 50,000 which is obtained by reacting 100 parts by weight of a polyester diol (a) with 0.1 to 5 parts by weight of diisocyanate, wherein the polyester diol (a) is obtained by conducting a polycondensation of 1 mol of an acid component consisting of 70 to 90 mol % of succinic acid and 10 to 30 mol % of adipic acid, with 1 to 1.1 mols of glycol; and 2.5 to 25 parts by weight of a second aliphatic polyester provided with branched long chains and having a number-average molecular weight of at least 50,000 which is obtained by reacting 100 parts by weight of a polyester polyol (c) with 0.1 to 5 parts by weight of diisocyanate, wherein the polyester polyol (c) is obtained by conducting a polycondensation of 1 mol of succinic acid, 1 to 1.1 mols of 1,4-butanediol and 0.25 to 1 mol % of trifunctional polyol relative to 100 mol % of said succinic acid.

3. A biodegradable, stretched blow molded article prepared by using a biodegradable aliphatic polyester blend composition (3) having a melting point of at least 70° C. comprising:

97.5 to 75 parts by weight of a first aliphatic polyester copolymer having a number-average molecular weight of at least 50,000 which is obtained by reacting 100 parts by weight of a polyester diol (a) with 0.1 to 5 parts by weight of diisocyanate, wherein the polyester diol (a) is obtained by conducting a polycondensation of 1 mol of an acid component consisting of 70 to 90 mol % of succinic acid and 10 to 30 mol % of adipic acid, with 1 to 1.1 mols of glycol; and 2.5 to 25 parts by weight of a second aliphatic polyester provided with branched longer chains and having a number-average molecular weight of at least 50,000 which is obtained by reacting 100 parts by weight of a polyester diol (d) with 0.1 to 1 part by weight of diisocyanate and then 0.1 to 4 parts by weight of trifunctional isocyanate, wherein the polyester diol (d) is obtained by conducting a polycondensation of 1 mol of succinic acid and 1 to 1.1 mols of 1,4-butanediol.

4. A stretched blow molded article as claimed in any one of claims of 1 to 3, wherein the glycol is 1,4-butanediol or ethylene glycol.

5. A stretched blow molded article as claimed in any one of claims 1 to 3, wherein the diisocyananate used to make the first aliphatic polyester copolymer and the second aliphatic polyerster is hexamethylene diisocyanante.

6. A stretched blow molded article as claimed in claim 2, wherein the trifunctional polyol is trimethylol propane or glycerin.

7. A stretched blow molded article as claimed in claim 3, wherein the trifunctional isocyanate is a compound selected from the group consisting of trimethylol propane.hexamethylene diisocyanate.adduct, cyclic hexamethylene diisocyanate trimer and hexamethyldiisocyanate.water.adduct.

8. A stretched blow molded article as claimed in any one of claims 1 to 3, wherein the composition has a heat of fusion which is less than or equal to 40 Joule/g.

9. A stretched blow molded article as claimed in any one of claims 1 to 3, wherein the composition is stretch-blow molded at a temperature of from 70° to 100° C.

* * * * *